Patented Feb. 5, 1924.

1,482,899

UNITED STATES PATENT OFFICE.

JOHANNES M. KESSLER, OF WEST ORANGE, NEW JERSEY, ASSIGNOR TO E. I. DU PONT DE NEMOURS & COMPANY, OF WILMINGTON, DELAWARE, A CORPORATION OF DELAWARE.

PROCESS OF PURIFYING CRUDE SYNTHETIC CAMPHOR.

No Drawing.  Application filed January 16, 1920.  Serial No. 351,936.

*To all whom it may concern:*

Be it known that I, JOHANNES M. KESSLER, a citizen of the United States, and a resident of West Orange, in the county of Essex and State of New Jersey, have invented a certain new and useful Process of Purifying Crude Synthetic Camphor, of which the following is a specification.

This invention relates to the purification of synthetic camphor contaminated with certain organic impurities, and comprises subjecting said camphor to a prolonged heat treatment preferably at a pressure substantially above atmospheric pressure.

In the manufacture of synthetic camphor from turpentine, the formation of pinene hydrohalide, such as pinene hydrochloride, is usually one of the first operations to be carried out. Although it is relatively easy to convert this latter substance into camphene and from there into borneol and finally into camphor, small amounts of organic halides, such for example as colophene chloride, etc., are tenaciously retained throughout the different stages of the manufacture and their removal from the final product was found impossible in some cases or could only be accomplished with considerable difficulty by expensive purification processes. Quite often the lack of proper refining methods was the main reason why synthetic camphor contaminated with traces of organic chlorides, but otherwise showing the same valuable properties as the natural product, could not be employed for most commercial purposes. The amount of organic chlorides present in the synthetic camphor may have been less than 1% and still such a product was liable to gradually split off free hydrochloric acid and so cause serious trouble wherever employed. Particularly serious and objectionable was the behavior of such synthetic camphor when it occurred in nitrocellulose plastics such as celluloid, pyralin, etc., which consist of approximately 70% nitrocellulose and 30% camphor. Discoloration of the more delicately colored compounds, instability and consequent decomposition of the nitrocellulose were likely to be caused by the splitting off of the hydrochloric acid.

The chief difficulty which is ordinarily encountered in the refining of synthetic camphor by dry distillation, is the development of free hydrochloric acid and an oily, yellow colored, acid reacting liquid which condenses on the sides of the chamber into which the camphor vapor is led, and by dropping into the main portion of the properly refined product contaminates it. The presence of free hydrochloric acid is not only very objectionable on account of its destructive action on the metal lined camphor subliming chambers, but is apt to cause very serious other damages by starting discoloration, instability, and consequent decomposition of the nitrocellulose when the latter is made into plastics with camphor containing it.

Experiments were tried to refine the crude material by first steam distilling it from a 10% caustic soda solution, drying the distillate and submitting it finally to dry distillation. Although steam distillation removed most of the tarry impurities and yielded a neutral product greatly improved in color but not yet satisfactory, its chlorine content was hardly different from that of the original camphor, indicating the presence of chlorides of considerable stability. Dry distillation of the steam distilled and dried camphor yielded a product contaminated with free hydrochloric acid to almost the same extent as direct dry distillation of the crude.

As the result of my researches, I discovered that a completely satisfactory product, free from chlorine, could be obtained by first subjecting the dry crude synthetic camphor to a long continued baking process, for example at a temperature above 190° C., and under pressure; the effect of this treatment is to break down any chlorides present into neutral, chlorine-free bodies and free hydrochloric acid. After removal of the acid, the camphor may be readily obtained in pure condition by distilling it under normal pressure in the regular manner. Starting out with practically dry crude synthetic camphor with a chlorine content of .5 to .6%, heating it well above its boiling point in a sealed glass tube or an iron autoclave and afterwards distilling, gave the following results:—

3 hrs. baking at 230° C. left 0.60% chlorine in the distilled camphor.

10 hrs. baking at 230° C. left 0.45% chlorine in the distilled camphor.

20 hrs. baking at 230° C. left 0.02% chlorine in the distilled camphor.

30 hrs. baking at 230% C. left no cholorine in the distilled camphor.

As an example of carrying out my invention, crude synthetic camphor is dried and melted at a temperature of about 175° C. in a steel retort or autoclave provided with a valve to permit and control the escape of steam. When all the water is driven off the valve is closed and the heat increased to approximately 225 to 235° C.; the pressure is maintained at from 25 to 30 pounds per square inch above atmospheric pressure. The hydrogen chloride resulting from decomposition of the organic chlorine-containing substances present in the crude synthetic camphor is allowed to escape from the retort occasionally. The heating at a temperature between about 225 and 235° C. is continued until tests indicate that no more acid is driven off; from 20 to 30 hours baking is usually required to complete the reaction. After decreasing the temperature in the retort to about 210° C. and reducing slowly the pressure in the retort by opening again the above mentioned valve for a few seconds, the camphor is then distilled and condensed in chambers in the usual manner.

Purified synthetic camphor can also be obtained from the properly baked crude product according to methods other than distillation. For example, the baked synthetic camphor may be dissolved in an organic solvent such as ethyl alcohol, naphtha, etc., and crystallized from a hot saturated solution on cooling or from an unsaturated solution on concentration by distillation. Any dirt or insoluble material present in such a solution can be removed by filtration through cloth or other filtering mediums.

Instead of baking the crude and dried synthetic camphor at a temperature of about 230° C., it is possible to bring about decomposition of the organic chlorides by baking at a temperature of, say, 205° C., and at, or slightly above, atmospheric pressure, for about 10 hours, distilling the camphor, subjecting it to another baking treatment at the same temperature (205–210° C.) for 5 or 6 hours, and again subjecting the camphor to dry distillation. I prefer, however, the more simple procedure of baking for from 20 to 30 hours at a temperature between 225 and 235° C.

Although I have mentioned specifically the use of temperatures up to 235° C. and pressures of 25 to 30 pounds, these pressures being such as can be safely used in retorts of ordinary boiler steel plate construction, my invention includes carrying out the baking operation at higher temperatures and higher pressures up to the point at which the camphor itself begins to decompose.

I claim:

1. The process which comprises heating crude synthetic camphor for from about 20 to 30 hours at a temperature above 190° C. and below that at which camphor itself begins to decompose.

2. The process of separating organic chlorides from impure camphor containing said chlorides which comprises heating said camphor at a temperature sufficient to decompose said organic chlorides but insufficient to decompose the camphor until decomposition of said chlorides is substantially completed.

3. The process of separating organic chlorides from impure camphor containing said chlorides which comprises heating said impure camphor substantially free from water for from about 20 to 30 hours at a temperature of from about 225 to 235° C.

4. The process of separating organic chlorides from impure camphor containing said chlorides which comprises heating said impure camphor substantially free from water for from about 20 to 30 hours at a temperature of from about 225 to 235° C. while permitting any hydrogen chloride which is formed to escape during the heating period.

5. The process of separating organic chlorides from impure camphor containing said chlorides which comprises heating said impure camphor substantially free from water for from about 20 to 30 hours at a temperature of from about 225 to 235° C. and at a pressure of from about 25 to 30 pounds above atmospheric pressure, while permitting any hydrogen chloride which is formed to escape at intervals during the heating period.

6. The process which comprises heating crude synthetic camphor substantially free from water for from about 20 to 30 hours at a temperature above 190° C. and below that at which camphor itself begins to decompose and at a pressure above that of the atmosphere.

7. The process of purifying crude synthetic camphor containing organic chlorides which comprises baking said crude camphor substantially free from water at a temperature sufficient to decompose the organic chlorides into products comprising hydrochloric acid gas, but insufficient to decompose the camphor itself, permitting the hydrochloric acid gas to escape at intervals during the baking, and finally distilling the camphor.

8. The process of purifying crude synthetic camphor containing organic chlorides which comprises baking said crude camphor substantially free from water at a temperature of from about 225 to 235° C., and at a pressure of from about 25 to 30 pounds above atmospheric pressure, permitting the hydrochloric acid gas to escape at intervals during the baking, and finally distilling the camphor under atmospheric pressure.

9. The process which comprises heating thoroughly dried crude synthetic camphor for from about 20 to 30 hours at a temperature above 190° C. and below that at which camphor itself begins to decompose.

10. The process of separating organic chlorides from impure camphor containing said chlorides which comprises heating said impure camphor to drive off any moisture contained therein and then further heating the resulting dried camphor for from about 20 to 30 hours at a temperature of from about 225 to 235° C.

In testimony whereof I affix my signature.

JOHANNES M. KESSLER.